(12) United States Patent
Tseng et al.

(10) Patent No.: US 9,136,700 B2
(45) Date of Patent: Sep. 15, 2015

(54) ELECTROSTATIC DISCHARGE PROTECTION CIRCUIT AND DISPLAY APPARATUS USING THE SAME

(71) Applicant: Au Optronics Corporation, Hsinchu (TW)

(72) Inventors: Chien-Chang Tseng, Kaohsiung (TW); Kuang-Hsiang Liu, Miaoli County (TW); Ya-Ting Yang, Keelung (TW)

(73) Assignee: Au Optronics Corporation, Hsinchu (TW)

( * ) Notice: Subject to any disclaimer, the term of this patent is extended or adjusted under 35 U.S.C. 154(b) by 135 days.

(21) Appl. No.: 13/875,302

(22) Filed: May 2, 2013

(65) Prior Publication Data

US 2014/0071109 A1  Mar. 13, 2014

(30) Foreign Application Priority Data

Sep. 13, 2012 (TW) ............................... 101133535 A

(51) Int. Cl.
*H02H 9/00* (2006.01)

(52) U.S. Cl.
CPC ........... *H02H 9/008* (2013.01); *G09G 2330/02* (2013.01); *G09G 2330/04* (2013.01)

(58) Field of Classification Search
CPC .................... G09G 2330/02; G09G 2330/025; G09G 2330/04; H02H 9/008; H02H 9/001; H02H 9/005; H02H 9/00
USPC .................................................. 345/90, 211
See application file for complete search history.

(56) References Cited

U.S. PATENT DOCUMENTS

| 4,400,711 | A  | * | 8/1983 | Avery | ........................... 257/133 |
| 6,753,836 | B2 | * | 6/2004 | Kwon  | ............................. 345/87 |
| 7,009,820 | B1 |   | 3/2006 | Hogg  | |

(Continued)

FOREIGN PATENT DOCUMENTS

| CN | 1624754   | 6/2005 |
| CN | 101097673 | 1/2008 |
| CN | 101373894 | 5/2012 |

OTHER PUBLICATIONS

Kim, Binn et al., "A Novel Depletion-Mode a-IGZO TFT Shift Register With a Node-Shared Structure", Jul. 2012, IEEE Electron Device Letters, vol. 33, No. 7, Jul. 2012, p. 1003.*

(Continued)

*Primary Examiner* — Larry Sternbane
(74) *Attorney, Agent, or Firm* — Jianq Chyun IP Office

(57) ABSTRACT

An electrostatic discharge protection circuit and a display apparatus are provided. The electrostatic discharge protection circuit adapted to the display apparatus having a display panel which has a signal line and a common voltage line. The electrostatic discharge protection circuit includes a first switching unit and a second switching unit. The first switching unit is electrically coupled to the signal line. The second switching unit is electronically coupled between the first switching unit and the common voltage line. When the display apparatus is shut down, the first switching unit and the second switching unit form a conductive path. When the display apparatus is turned on, the first switching unit receives a first control signal, and the second switching unit receives a second control signal, so that at least one of the first switching unit and the second switching unit is turned off at the same time.

16 Claims, 3 Drawing Sheets

(56) References Cited

U.S. PATENT DOCUMENTS 7,379,127 B2 *  5/2008  Tsao ............................. 349/40
2002/0018154 A1 *  2/2002  Yoo et al. ..................... 349/40

OTHER PUBLICATIONS

"Office Action of China Counterpart Application", issued on May 30, 2014, p. 1-p. 7, in which the listed references were cited.

* cited by examiner

ELECTROSTATIC DISCHARGE PROTECTION CIRCUIT AND DISPLAY APPARATUS USING THE SAME

CROSS-REFERENCE TO RELATED APPLICATION

This application claims the priority benefit of Taiwan application serial no. 101133535, filed on Sep. 13, 2012. The entirety of the above-mentioned patent application is hereby incorporated by reference herein and made a part of this specification.

BACKGROUND OF THE INVENTION

1. Technical Field

The invention relates generally to an electrostatic discharge (ESD) protection circuit and a display apparatus using the same, and more particularly to an ESD protection circuit formed by a plurality of switching units and a display apparatus using the same.

2. Related Art

Nowadays, the liquid crystal display (LCD), due to its high picture quality, good spatial utilization, low power consumption, radiation-free operation and other distinguished features, has become mainstream in the display device market. Typically speaking, the LCD is configured with a LCD panel. Extremely fine circuitry and components such as a plurality of gate lines, data lines, and thin film transistors (TFTs) are formed on the LCD panel by the use of semiconductor processes. When the aforementioned circuitry or components are affected by instantaneous high voltage caused by electrostatic discharge, the circuitry and components of the LCD panel may be permanently damaged, thereby resulting in the malfunction of the LCD panel.

In order to prevent electrostatic discharge from damaging the internal circuitry or components of the LCD panel, ESD protection circuits are typically designed on the LCD panel. Accordingly, the design of the ESD protection circuit is one of the important areas in a LCD panel.

SUMMARY OF THE INVENTION

The invention provides an electrostatic discharge (ESD) protection circuit and a display apparatus using the same, capable of providing protection when the display is turned on or shut down.

The invention provides an ESD protection circuit adapted to a display apparatus having a display panel, and the display panel configured with a signal line and a common voltage line. The ESD protection circuit includes a first switching unit and a second switching unit. The first switching unit is electrically coupled to the signal line. The second switching unit is electrically coupled between the first switching unit and the common voltage line. When the display apparatus is shut down, the first switching unit and the second switching unit form a conductive path. Moreover, when the display apparatus is turned on, the first switching unit receives a first control signal and the second switching unit receives a second control signal, so that at least one of the first switching unit and the second switching unit is turned off at the same time.

According to an embodiment of the invention, the first switching unit includes a first transistor. The first transistor has a first terminal electrically coupled to the signal line, a second terminal electrically coupled to the second switching unit, and a control terminal receiving the first control signal. The second switching unit includes a second transistor. The second transistor has a first terminal electrically coupled to the second terminal of the first transistor, a second terminal electrically coupled to the common voltage line, and a control terminal receiving the second control signal.

According to an embodiment of the invention, the first switching unit further includes a third transistor. The third transistor has a first terminal electrically coupled to the first terminal of the first transistor, a second terminal electrically coupled to the second terminal of the first transistor, and a control terminal electrically coupled to the control terminal of the first transistor. The second switching unit further includes a fourth transistor. The fourth transistor has a first terminal electrically coupled to the first terminal of the second transistor, a second terminal electrically coupled to the second terminal of the second transistor, and a control terminal electrically coupled to the control terminal of the second transistor.

According to an embodiment of the invention, the first transistor, the second transistor, the third transistor, and the fourth transistor are respectively an IGZO depletion mode transistor.

According to an embodiment of the invention, the first switching unit further includes a fifth transistor. The fifth transistor has a first terminal electrically coupled to the second terminal of the first transistor, a second terminal electrically coupled to the first terminal of the second transistor, and a control terminal electrically coupled to the control terminal of the first transistor, in which the first terminal of the second transistor is electrically coupled to the second terminal of the first transistor through the fifth transistor. The second switching unit further includes a sixth transistor. The sixth transistor has a first terminal electrically coupled to the second terminal of the second transistor, a second terminal electrically coupled to the common voltage line, and a control terminal electrically coupled to the control terminal of the second transistor, in which the second terminal of the second transistor is electrically coupled to the common voltage line through the sixth transistor.

According to an embodiment of the invention, the ESD protection circuit further includes a third switching unit electrically coupled to the second switching unit and the common voltage line, the third switching unit receiving the first control signal and is controlled by the first control signal to be turn on, in which the second switching unit is electrically coupled to the common voltage line through the third switching unit.

According to an embodiment of the invention, the data line is a gate line or a data line.

The invention provides an ESD protection circuit adapted to a display apparatus having a display panel, and the display panel configured with a signal line and a common voltage line. The ESD protection circuit includes a first normally closed switch and a second normally closed switch. The first normally closed switch is electrically coupled to the signal line and is configured to receive the first control signal. The second normally closed switch is electrically coupled between the first normally closed switch and the common voltage line and is configured to receive a second control signal.

According to an embodiment of the invention, the ESD protection circuit further includes a third normally closed switch and a fourth normally closed switch. The third normally closed switch is electrically coupled between the first normally closed switch and the second normally closed switch and is configured to receive the first control signal. The fourth normally closed switch is electrically coupled between the second normally closed switch and the common voltage line and is configured to receive the second control signal.

According to an embodiment of the invention, the ESD protection circuit further includes a fifth normally closed switch and a sixth noir rally closed switch. The fifth normally closed switch is electrically and parallel coupled to the first normally closed switch and is configured to receive the first control signal. The sixth normally closed switch is electrically and parallel coupled to the second normally closed switch and is configured to receive the second control signal.

According to an embodiment of the invention, the ESD protection circuit further includes a seventh normally closed switch electrically coupled between the second normally closed switch and the common voltage line and is configured to receive the first control signal.

According to an embodiment of the invention, an enable period of the first control signal and an enable period of the second control signal do not overlap.

According to an embodiment of the invention, a duty cycle of the first control signal and a duty cycle of the second control signal are respectively between 1% to 49.9%.

The invention provides a display apparatus having the aforementioned ESD protection circuit, the display apparatus including a display panel and a driving circuit. The driving unit is electrically connected to the display panel to drive the display panel. The display panel includes a plurality of pixels arranged in an array, a plurality of gate lines, a plurality of data lines, and the aforementioned ESD protection circuit. Each of the gate lines is electrically coupled to the corresponding pixels of the plurality of pixels, and each of the data lines is electrically coupled to the corresponding pixels of the plurality of pixels. The ESD protection circuit is electrically coupled to one of the gate lines or one of the data lines. The common voltage line is electrically coupled to the ESD protection circuit.

In summary, in the ESD protection circuits according to embodiments of the invention, when the display apparatus is shut down, the first switching unit and the second switching unit form a conductive path to provide the ESD protection capability. When the display apparatus is turned on, at least one of the first switching unit and the second switching unit is turned off at the same time, so as to prevent the voltage level of the signal line from being effected. However, the turned off first switching unit and second switching unit are equivalent to a reverse-biased diode, such that the electrostatic discharged high voltage causes the equivalent diode of the first switching unit and the second switching unit to breakdown and discharge, and thereby the ESD protection capability is provided.

Several exemplary embodiments accompanied with figures are described in detail below to further describe the disclosure in details.

BRIEF DESCRIPTION OF THE DRAWINGS

The accompanying drawings are included to provide a further understanding of the invention, and are incorporated in and constitute a part of this specification. The drawings illustrate embodiments of the invention and, together with the description, serve to explain the principles of the invention.

DESCRIPTION OF EMBODIMENTS

Figure 1:
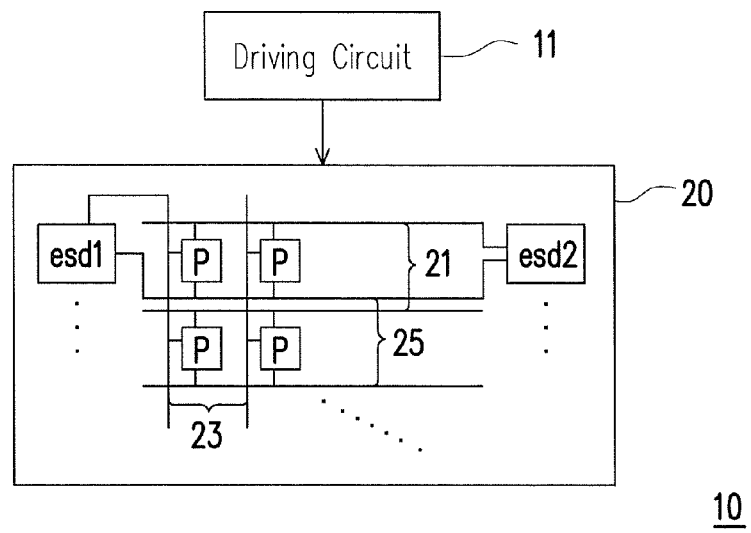
FIG. 1 is a schematic system view of a display apparatus according to an embodiment of the invention.

FIG. 1 is a schematic system view of a display apparatus according to an embodiment of the invention. With reference to FIG. 1, in the present embodiment, a display apparatus 10 includes a driving circuit 11 and a display panel 20. The driving circuit 11 is for driving the display panel 20. The display panel 20 includes a plurality of gate lines 21, a plurality of data lines 23, a plurality of pixels P arranged in an array, a plurality of common voltage lines 25, and a plurality of electrostatic discharge (ESD) protection circuits esd1. The display panel 20 may further include a plurality of ESD protection circuits esd2. Each of the pixels P is electrically coupled to the corresponding gate line 21, data line 23, and common voltage line 25. The ESD protection circuits esd2 are electrically coupled to the corresponding gate line 21 and the corresponding common voltage line 25, so as to prevent damage to the gate lines 21 and the pixels P due to electrostatic discharge. The ESD protection circuits esd1 are electrically coupled to the corresponding data line 23 and the corresponding common voltage line 25, so as to prevent damage to the data lines 23 and the pixels P due to electrostatic discharge.

Figure 2:
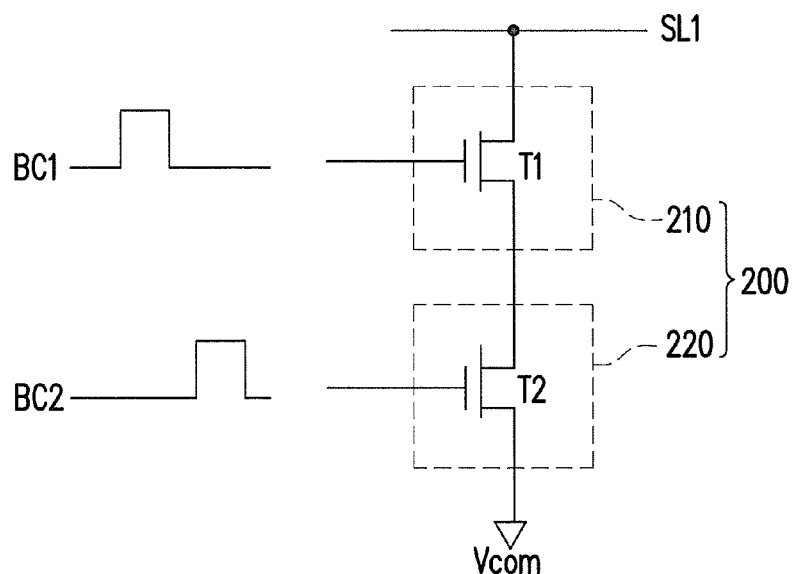
FIG. 2 is a schematic circuit diagram of an ESD protection circuit according to an embodiment of the invention.

FIG. 2 is a schematic circuit diagram of an ESD protection circuit according to an embodiment of the invention. With reference to FIGS. 1 and 2, the ESD protection circuits esd1 and esd2 shown in FIG. 1 may be implemented by an ESD protection circuit 200 of the present embodiment. In the present embodiment, the ESD protection circuit 200 includes a first switching unit 210 and a second switching unit 220, in which the first switching unit 210 includes a transistor T1 (corresponding to a first transistor) and the second switching unit 220 includes a transistor T2 (corresponding to a second transistor).

The transistor T1 of the first switching unit 210 has a drain (corresponding to a first terminal) electrically coupled to a signal line SL1, and a gate (corresponding to a control terminal) receiving a first control signal BC1, in which the signal line SL1 may be the gate lines 21 or the data lines 23. The transistor T2 of the second switching unit 220 has a drain (corresponding to a first terminal) electrically coupled to a source (corresponding to a second terminal) of the transistor T1 of the first switching unit 210. Moreover, the transistor T2 of the second switching unit 220 has a gate (corresponding to a control terminal) receiving a second control signal BC2, and a source (corresponding to a second terminal) electrically coupled to the common voltage line 25 to receive a common voltage Vcom, in which the common voltage line 25 is a circuit with a large area electrode, for example. Moreover, the common voltage line 25 may be the common voltage line of an active array substrate (not drawn) of the display panel 20, or the common voltage line of a color filter substrate (not drawn) of the display panel 20, but embodiments of the invention are not limited thereto.

In the present embodiment, the first control signal BC1 and the second control signal BC2 are provided by the driving circuit 11, for example. In addition, the transistors T1 and T2 are IGZO depletion mode transistors, for example, in which an enable period of the first control signal BC1 and an enable period of the second control signal BC2 do not overlap.

Accordingly, when the display apparatus 10 is shut down, the transistor T1 of the first switching unit 210 and the transistor T2 of the second switching unit 220 are turned off, but a current still flows through the transistors T1 and T2 due to the high leakage current property of the depletion mode transistor. Therefore, the transistor T1 of the first switching unit 210 and the transistor T2 of the second switching unit 220 form a conductive path, and thereby an electrostatic discharge protection function can be provided.

On the other hand, when the display apparatus 10 is turned on, the driving circuit 11 provides the first control signal BC1 and the second control signal BC2, so that at least one of the transistor T1 of the first switching unit 210 and the transistor T2 of the second switching unit 220 is turned off at the same time. In other words, at least one of the first switching unit 210 and the second switching unit 220 is turned off at the same time, so as to prevent the voltage level of the signal line SL1 from being affected by the common voltage Vcom. Moreover, the low voltage level of the first control signal BC1 and the second control signal BC2 is far lower than the common voltage Vcom, so as to reduce the leakage current of the transistors T1 and T2. For example, the low voltage level of the first control signal BC1 and the second control signal BC2 may be determined according to an operating curve of the current and voltage of the transistor T1 of the first switching unit 210 and the transistor T2 of the second switching unit 220. Typically speaking, the low voltage level of the first control signal BC1 and the second control signal BC2 can be approximately 3 V lower than the common voltage Vcom.

However, when the transistors T1 and T2 are turned off, the transistors can be equivalent to a reverse-biased diode, and the electrostatic discharged high voltage and current cause the equivalent diode of the transistors T1 and T2 to breakdown. Therefore, charges caused by electrostatic discharged discharges can be discharged from the transistors T1 and T2 under breakdown, and accordingly provide the electrostatic discharge protection function. Moreover, since the enable period of the first control signal BC1 and the enable period of the second control signal BC2 do not overlap, the transistors T1 and T2 alternate being in the turn off state. Therefore, the transistors T1 and T2 can be prevented from being in the turn off state for a long period of time, which causes the leakage current to increase.

In the present embodiment, a duty cycle of the first control signal BC1 and a duty cycle of the second control signal BC2 are substantially the same. Moreover, the duty cycles of the first control signal BC1 and the second control signal BC2 may be respectively 1% to 49.9% according to different circuit designs, and embodiments of the invention are not limited thereto.

In the present embodiment, the transistors T1 and T2 may be respectively a normally closed switch (respectively referred to as the normally closed switches T1 and T2). The normally closed switch T1 (corresponding to a first normally closed switch) is electrically coupled to the signal line SL1, and the normally closed switch T1 receives the first control signal BC1. The normally closed switch T2 (corresponding to a second normally closed switch) is electrically coupled between the normally closed switch T1 and the common voltage line 25 transmitting the common voltage Vcom, and the normally closed switch T2 receives the second control signal BC2. Typically speaking, a normally closed switch refers to a switch that is typically in a conductive state. In other words, the normally closed switch refers to a switch that is conductive when no external control signals are applied.

Figure 3:
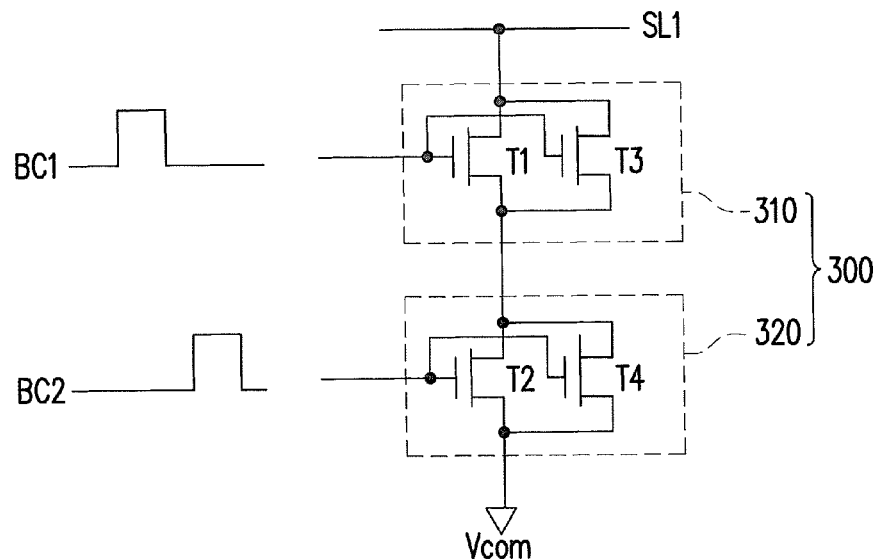
FIG. 3 is a schematic circuit diagram of an ESD protection circuit according to an embodiment of the invention.

FIG. 3 is a schematic circuit diagram of an ESD protection circuit according to an embodiment of the invention. With reference to FIGS. 1, 2, and 3, the ESD protection circuits esd1 and esd2 shown in FIG. 1 may be implemented by an ESD protection circuit 300 of the present embodiment. In the present embodiment, compared to the first switching unit 210 and the second switching unit 220, a first switching unit 310 of the ESD protection circuit 300 further includes a transistor T3 (corresponding to a third transistor), and a second switching unit 320 of the ESD protection circuit 300 further includes a transistor T4 (corresponding to a fourth transistor). The transistors T3 and T4 are IGZO depletion mode transistors, for example.

The transistor T3 has a drain (corresponding to a first terminal) electrically coupled to the drain of the transistor T1, a source (corresponding to a second terminal) electrically coupled to the source of the transistor T1, and a gate (corresponding to a control terminal) electrically coupled to the gate of the transistor T1 to receive the first control signal BC1.

The transistor T4 has a drain (corresponding to a first terminal) electrically coupled to the drain of the transistor T2, a source (corresponding to a second terminal) electrically coupled to the source of the transistor T2, and a gate (corresponding to a control terminal) electrically coupled to the gate of the transistor T2 to receive the second control signal BC2.

In the present embodiment, the transistors T1-T4 may be respectively viewed as a normally closed switch (respectively referred to as the normally closed switches T1-T4), in which the electrical coupling relationships of the normally closed switches T1 and T2 can be referred to FIG. 2. The normally closed switch T3 (corresponding to a fifth normally closed switch) is electrically and parallel coupled to the normally closed switch T1, and the normally closed switch T3 receives the first control signal BC1. The normally closed switch T4 (corresponding to a sixth normally closed switch) is electrically and parallel coupled to the normally closed switch T2, and the normally closed switch T4 receives the second control signal BC2.

Figure 4:
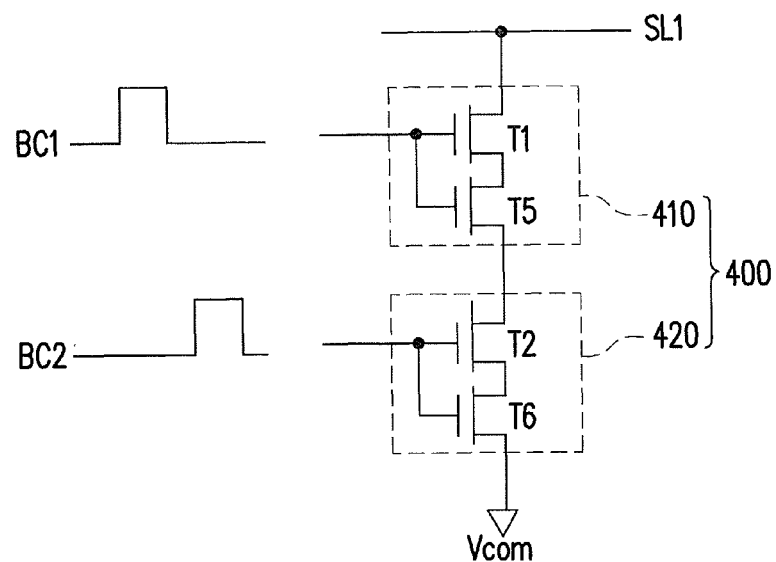
FIG. 4 is a schematic circuit diagram of an ESD protection circuit according to an embodiment of the invention.

FIG. 4 is a schematic circuit diagram of an ESD protection circuit according to an embodiment of the invention. With reference to FIGS. 1, 2, and 4, the ESD protection circuits esd1 and esd2 shown in FIG. 1 may be implemented by an ESD protection circuit 400 of the present embodiment. In the present embodiment, compared to the first switching unit 210 and the second switching unit 220, a first switching unit 410 of the ESD protection circuit 400 further includes a transistor T5 (corresponding to a fifth transistor), and a second switching unit 420 of the ESD protection circuit 400 further includes a transistor T6 (corresponding to a sixth transistor). The transistors T5 and T6 are IGZO depletion mode transistors, for example.

The transistor T5 has a drain (corresponding to a first terminal) electrically coupled to the source of the transistor T1, a source (corresponding to a second terminal) electrically coupled to the drain of the transistor T2, and a gate (corresponding to a control terminal) electrically coupled to the gate of the transistor T1 to receive the first control signal BC1. Moreover, the drain of the transistor T2 is electrically coupled to the source of the transistor T1 through the transistor T5.

The transistor T6 has a drain (corresponding to a first terminal) electrically coupled to the source of the transistor T2, a source (corresponding to a second terminal) electrically coupled to the common voltage line 25 to receive the common voltage Vcom, and a gate (corresponding to a control terminal) electrically coupled to the gate of the transistor T2 to receive the second control signal BC2. Moreover, the source of the transistor T2 is electrically coupled to the common voltage line 25 through the transistor T6.

In the present embodiment, the transistors T1, T2, T5, and T6 may be respectively a normally closed switch (respectively referred to as the normally closed switches T1, T2, T5, and T6). Moreover, the non tally closed switch T1 is electrically coupled to the signal line SL1 and is configured to receive the first control signal BC1. The normally closed switch T5 (corresponding to a third normally closed switch) is electrically coupled between the normally closed switch T1 and the normally closed switch T2 and is configured to receive the first control signal BC1. The normally closed switch T2 is electrically coupled between the normally closed switch T5 and the normally closed switch T6 (corresponding to a fourth normally closed switch) and is configured to receive the second control signal BC2. The normally closed switch T6 is electrically coupled between the normally closed switch T2 and the common voltage line 25 transmitting the common voltage Vcom, and the normally closed switch T6 receives the second control signal BC2.

Figure 5:
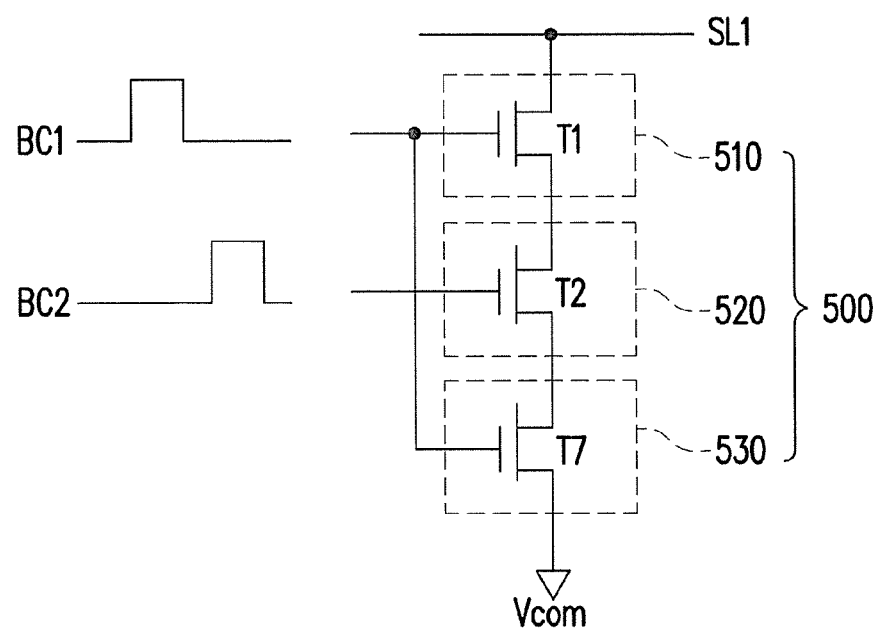
FIG. 5 is a schematic circuit diagram of an ESD protection circuit according to an embodiment of the invention.

FIG. 5 is a schematic circuit diagram of an ESD protection circuit according to an embodiment of the invention. With reference to FIGS. 1, 2, and 5, the ESD protection circuits esd1 and esd2 shown in FIG. 1 may be implemented by an ESD protection circuit 500 of the present embodiment. In the present embodiment, the ESD protection circuit 500 includes a first switching unit 510, a second switching unit 520, and a third switching unit 530, in which the first switching unit 510 and the second switching unit 520 are similar to the first switching unit 210 and the second switching unit 220, and the third switching unit 530 includes a transistor T7. Moreover, the transistor T7 is an IGZO depletion mode transistor, for example. The transistor T7 of the third switching unit 530 has a drain electrically coupled to the source of the transistor T2 of the second switching unit 520, a source electrically coupled to the common voltage line 25 to receive the common voltage Vcom, and a gate electrically coupled to the gate of the transistor T1 of the first switching unit 510 to receive the first control signal BC1. The transistor T2 of the second switching unit 520 is electrically connected to the common voltage line 25 through the transistor T7 of the third switching unit 530. In addition, the transistor T7 of the third switching unit 530 is controlled by the first control signal BC1 to turn on.

In the present embodiment, the transistors T1, T2, and T7 may be respectively a normally closed switch (respectively referred to as the normally closed switches T1, T2, and T7), in which the electrical coupling relationships of the normally closed switches T1 and T2 can be referred to FIG. 2. The normally closed switch T7 (corresponding to a seventh normally closed switch) is electrically coupled between the normally closed switch T2 and the common voltage line 25 transmitting the common voltage Vcom, and the normally closed switch T7 receives the first control signal BC1. Moreover, the transistors T1, T2, T3, T4, T5, T6, and T7 respectively depicted in FIGS. 2, 3, 4, and 5 may be depletion mode transistors, IGZO depletion mode transistors, n-type depletion mode transistors, thin film depletion mode transistors, or depletion mode field-effect transistors.

In view of the foregoing, in the ESD protection circuits according to embodiments of the invention, when the display apparatus is shut down, the first switching unit and the second switching unit (e.g., serially connected normally closed switches) form a conductive path to provide the ESD protection capability. When the display apparatus is turned on, at least one of the first switching unit and the second switching unit is turned off at the same time, so as to prevent the voltage level of the signal line from being effected. However, the turned off first switching unit and second switching unit (e.g., parallel connected normally closed switches) are equivalent to a reverse-biased diode, such that the electrostatic discharged high voltage causes the equivalent diode of the first switching unit and the second switching unit to breakdown and discharge, and thereby the ESD protection capability is provided.

Although the invention has been described with reference to the above embodiments, it will be apparent to one of ordinary skill in the art that modifications to the described embodiment may be made without departing from the spirit of the invention. Accordingly, the scope of the invention will be defined by the attached claims not by the above detailed descriptions.

What is claimed is:

1. An electrostatic discharge protection circuit adapted to a display apparatus having a display panel, the display panel configured with a signal line and a common voltage line, the electrostatic discharge protection circuit comprising:
   a first switching unit electrically coupled to the signal line; and
   a second switching unit electrically coupled between the first switching unit and the common voltage line,
   wherein, when the display apparatus is shut down, the first switching unit and the second switching unit form a conductive path, and when the display apparatus is turned on, the first switching unit is configured to receive a first control signal, and the second switching unit is configured to receive a second control signal, so that at least one of the first switching unit and the second switching unit is turned off at the same time.

2. The electrostatic discharge protection circuit of claim 1, wherein the first switching unit comprises:
   a first transistor having a first terminal electrically coupled to the signal line, a second terminal electrically coupled to the second switching unit, and a control terminal configured to receive the first control signal; and
   the second switching unit comprises:
   a second transistor having a first terminal electrically coupled to the second terminal of the first transistor, a second terminal electrically coupled to the common voltage line, and a control terminal configured to receive the second control signal.

3. The electrostatic discharge protection circuit of claim 2, wherein the first switching unit further comprises:
   a third transistor having a first terminal electrically coupled to the first terminal of the first transistor, a second terminal electrically coupled to the second terminal of the first transistor, and a control terminal electrically coupled to the control terminal of the first transistor; and
   the second switching unit further comprises:
   a fourth transistor having a first terminal electrically coupled to the first terminal of the second transistor, a second terminal electrically coupled to the second terminal of the second transistor, and a control terminal electrically coupled to the control terminal of the second transistor.

4. The electrostatic discharge protection circuit of claim 3, wherein the first transistor, the second transistor, the third transistor, and the fourth transistor are respectively an IGZO depletion mode transistor.

5. The electrostatic discharge protection circuit of claim 2, wherein the first switching unit further comprises:
   a fifth transistor having a first terminal electrically coupled to the second terminal of the first transistor, a second terminal electrically coupled to the first terminal of the second transistor, and a control terminal electrically coupled to the control terminal of the first transistor, wherein the first terminal of the second transistor is electrically coupled to the second terminal of the first transistor through the fifth transistor; and
   the second switching unit further comprises:
   a sixth transistor having a first terminal electrically coupled to the second terminal of the second transistor, a second terminal electrically coupled to the common voltage line, and a control terminal electrically coupled to the control terminal of the second transistor, wherein the second terminal of the second transistor is electrically coupled to the common voltage line through the sixth transistor.

6. The electrostatic discharge protection circuit of claim 1, further comprising:
a third switching unit electrically coupled to the second switching unit and the common voltage line, the third switching unit configured to receive the first control signal and is controlled by the first control signal to turn on, wherein the second switching unit is electrically coupled to the common voltage line through the third switching unit.

7. The electrostatic discharge protection circuit of claim 1, wherein the signal line is a gate line or a data line.

8. The electrostatic discharge protection circuit of claim 1, wherein an enable period of the first control signal and an enable period of the second control signal do not overlap.

9. The electrostatic discharge protection circuit of claim 1, wherein a duty cycle of the first control signal and a duty cycle of the second control signal are respectively between 1% to 49.9%.

10. An electrostatic discharge protection circuit adapted to a display apparatus having a display panel, the display panel configured with a signal line and a common voltage line, the electrostatic discharge protection circuit comprising:
a first normally closed switch electrically coupled to the signal line and configured to receive a first control signal; and
a second normally closed switch electrically coupled between the first normally closed switch and the common voltage line and configured to receive a second control signal.

11. The electrostatic discharge protection circuit of claim 10, further comprising:
a third normally closed switch electrically coupled between the first normally closed switch and the second normally closed switch and configured to receive the first control signal; and
a fourth normally closed switch electrically coupled between the second normally closed switch and the common voltage line and configured to receive the second control signal.

12. The electrostatic discharge protection circuit of claim 10, further comprising:
a fifth normally closed switch electrically and parallel coupled to the first normally closed switch and configured to receive the first control signal; and
a sixth normally closed switch electrically and parallel coupled to the second normally closed switch and configured to receive the second control signal.

13. The electrostatic discharge protection circuit of claim 10, further comprising:
a seventh normally closed switch electrically coupled between the second normally closed switch and the common voltage line and configured to receive the first control signal.

14. The electrostatic discharge protection circuit of claim 10, wherein an enable period of the first control signal and an enable period of the second control signal do not overlap.

15. The electrostatic discharge protection circuit of claim 10, wherein a duty cycle of the first control signal and a duty cycle of the second control signal are respectively between 1% to 49.9%.

16. A display apparatus having the electrostatic discharge protection circuit of claim 10, comprising:
a display panel, comprising:
a plurality of pixels arranged in an array;
a plurality of gate lines, each of the gate lines being electrically coupled to the corresponding pixels of the plurality of pixels;
a plurality of data lines, each of the data lines being electrically coupled to the corresponding pixels of the plurality of pixels;
an electrostatic discharge protection circuit of claim 10 electrically coupled to one of the gate lines or one of the data lines; and
a common voltage line electrically coupled to the electrostatic discharge protection circuit; and
a driving unit electrically connected to the display panel to drive the display panel.

* * * * *